INVENTORS.
Ming C. Hsu &
BY Ralph M. Stallard
W. J. Pettigrew
ATTORNEY

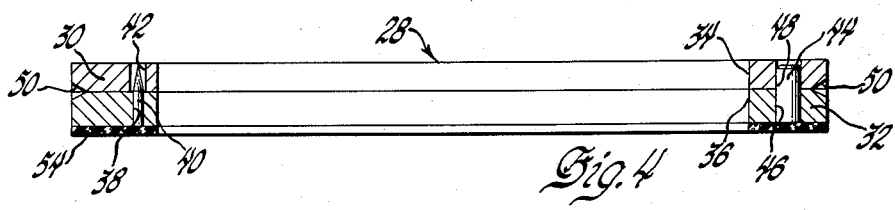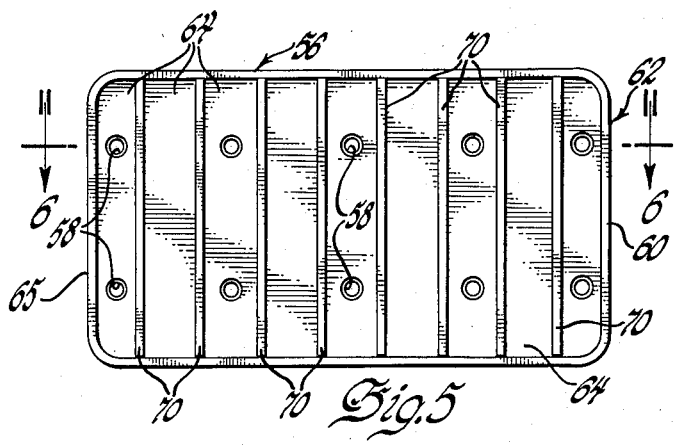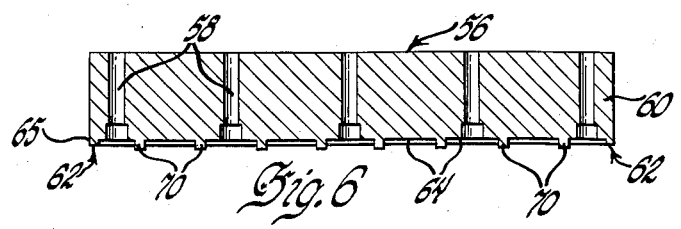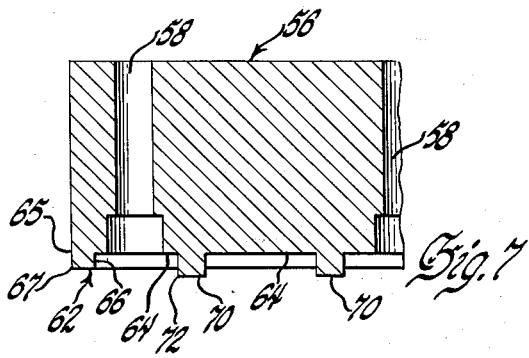

United States Patent Office 2,982,456
Patented May 2, 1961

2,982,456

METHOD FOR SEVERING THERMOPLASTIC MATERIALS

Ming C. Hsu, Centerline, and Ralph M. Stallard, Utica, Mich., assignors to General Motors Corporation, Detroit, Mich., a corporation of Delaware Filed Mar. 26, 1957, Ser. No. 648,673

4 Claims. (Cl. 225—2)

This invention relates to a method for severing thermoplastic materials and more particularly to a method for severing thermoplastic trim materials by means of dielectric heating.

Dielectric heating is a selective heating process whereby heat can be developed within an electrical insulating or dielectric material. Since the dielectric material is one which also does not normally conduct any appreciable amount of electrical current, dielectric heating does not result from the resistance of the material to current flow but rather from the frictional heating caused by the forced back and forth rotating movement of the molecules of the material. The force that produces the heating will be uniform throughout the material if the material has a uniform molecular arrangement and if the electrical field strength is uniform.

When the dielectric material is placed in an electrical field such as exists between two plates or electrodes having a voltage impressed across them whereby one of the planes is positive and the other is negative, the molecules of the dielectric material appear to stretch out and elongate themselves so that one end of the molecule has a positive charge which points toward the electrode with the negative charge and the other end of the molecule has a negative charge which points toward the electrode with the positive charge.

If the charge between the plates is reversed so that the positive plate now becomes negative and vice versa, the molecules will rotate to realign themselves. Thus, if an alternating current of radio frequency is impressed across the electrodes, the electrodes will continually change their charge and the molecules of the dielectric material will be forced to rotate back and forth as the electrodes change their charge. As the molecules of the dielectric material rotate back and forth, heat will be developed within the dielectric material, although the electrodes will not become heated except by conduction from the heated dielectric material if they are in contact therewith.

This invention utilizes the property of dielectric materials to become heated when subjected to an alternating current of radio frequency to provide a method for severing the material, and, in its preferred embodiment, provides a method for severing a finite portion from a sheet of thermoplastic material by means of dielectric heating. The finite portion may be any size or shape but is finite in the sense that it has a continuous periphery or boundary.

In the preferred embodiment of the invention, a holder for the sheet of thermoplastic material includes a pair of releasable members having openings therethrough which are aligned when the members are assembled. The sheet of thermoplastic material is secured in place between the members so as to be held taut across the openings therethrough. One of the members is provided with a facing of resilient material, and the holder is supported upon the lower electrode of a dielectric heating press with the resilient facing in engagement with the support. Such presses are commonly known and used and, therefore, the details of the press are unimportant to an understanding of the invention. However, it will be understood that the press generally includes a lower or stationary press electrode and an upper or movable press electrode having a die secured thereto of the desired size or shape of the finite portion to be severed from the sheet of thermoplastic material.

After the holder has been supported on the lower press electrode, the upper press electrode is moved downwardly until the die engages the portion of the sheet of thermoplastic material held taut across the opening of the holder. Thereafter, as the die continues to be lowered, it will depress a finite portion of the material out of the normal plane thereof under tension and will also partially compress the resilient facing of the holder. An alternating current of radio frequency is then impressed across the upper and lower electrodes of the press. Since the electric field will concentrate around the edge of the die, the concentration of the field between the die and the lower electrode will be greatest immediately adjacent the periphery of the die. Thus, a relatively narrow continuous area of the thermoplastic material immediately adjacent the die will become heated to the highest temperature to cause this narrow area to be softened. The tension in the sheet of thermoplastic material will thereupon cause the finite portion of the material to become cleanly separated along the relatively narrow area of highest temperature. The separation of the finite portion will also allow the resilient facing of the holder to shift the frame upwardly and remove the remainder of the sheet of thermoplastic material away from the finite portion and die face. Thus, the finite portion is severed from the remainder of the thermoplastic sheet solely by means of dielectric heating.

The primary object of this invention is to provide an improved method for severing thermoplastic material. Another object of this invention is to provide an improved method for severing thermoplastic material by means of dielectric heating. A more specific object of this invention is to provide a method for severing finite portions from thermoplastic sheet material by means of dielectric heating.

These and other objects of this invention will be readily apparent from the following specification and drawings, in which:

Figure 4 is a sectional view taken on the plane indicated by line 4—4 of Figure 3;

Figure 5 is a view of the die;

Figure 6 is a sectional view taken on the plane indicated by line 6—6 of Figure 5; and Figure 7 is an enlarged view of a portion of Figure 6.

Before proceeding with a further description, it will be understood that the subject method may either be used to sever finite portions from sheets of thermoplastic material without any further operation on the finite portion or may be used to sever the finite portion and then emboss the finite portion on a trim assembly in a continuous operation. Although the subject invention will be described in conjunction with such a continuous operation, reference may be had to applicants' co-pending application Serial No. 648,654, filed March 26, 1957, and assigned to the assignee of the present invention for a more complete description of the continuous operation which is disclosed and claimed therein.

Figure 1:
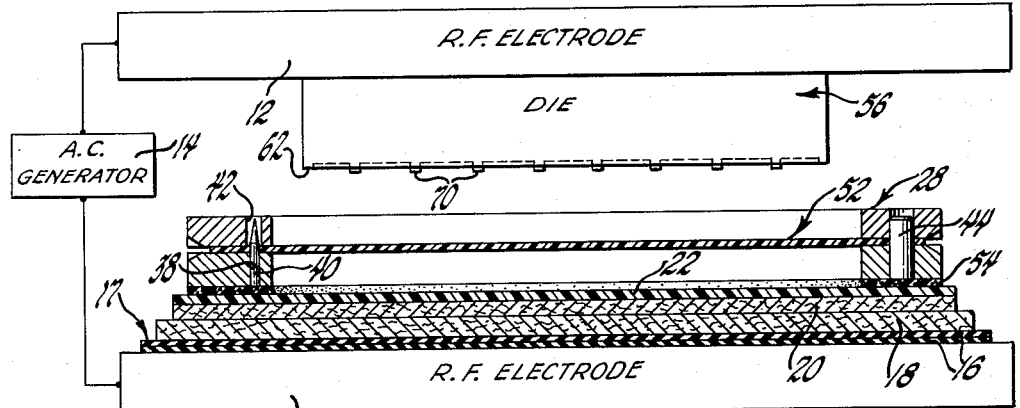
Figure 1 is a schematic view of a dielectric press having the sheet of thermoplastic material positioned therein prior to the severing operation.

Referring now to Figure 1 of the drawings, a dielectric heating press of common type includes a lower or stationary press electrode 10 and an upper or movable press electrode 12 which is movable toward and away from the lower press electrode by suitable operating means. An alternating current generator 14 is connected in series with the upper and lower press electrodes in order to impress an alternating current of radio frequency therebetween. One or more buffer sheets 16 of silicone rubber or butyl rubber are laid on the lower press electrode in order to prevent arcing between the upper and lower electrodes when the press is closed and also to provide a resilient support for a trim assembly 17 to insure equal pressure of the die on all areas of the trim assembly engaged thereby. As previously mentioned, the subject invention will be described in conjunction with a continuous operation whereby a finite portion is severed from a sheet of thermoplastic material and then embossed on a trim assembly. Although one particular trim assembly 17 will now be described, it will be understood that other trim assemblies may be used, as set forth in applicants' co-pending application hereinbefore mentioned.

The trim assembly 17 includes a backing 18 which is supported by the sheets 16 on the press electrode 10. The backing may be cardboard or Kraft board or may be of other rigid, semi-rigid, or flexible material as desired. Immediately adjacent the backing, a layer of riser material 20 is provided. This riser material may be hair or wool padding which has been impregnated with a thermoplastic material in fiber or powdered form. A sheet 22 of trim material is then laid upon the layer of riser material. The trim material may be any thermoplastic material such as vinyl chloride, vinylidene chloride, either supported or unsupported, other plastics or synthetics formed into flexible sheets, or leather, etc.

Figure 3:
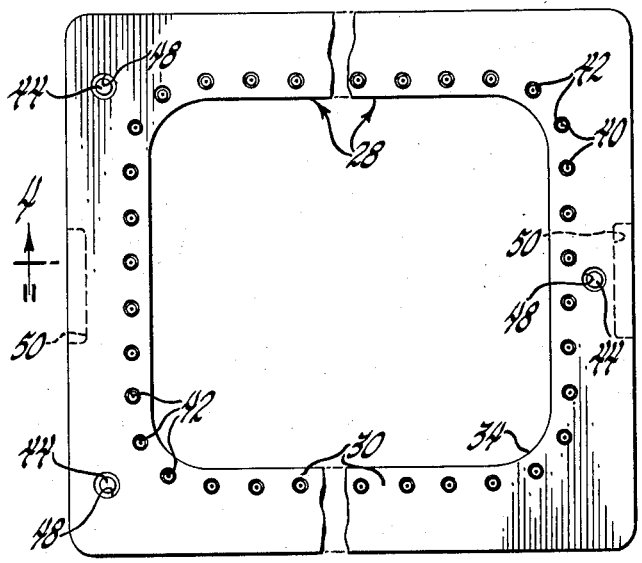
Figure 3 is a view of the holder for the sheet of thermoplastic material.

Referring particularly to Figures 3 and 4 of the drawings, the frame or holder 28 for the sheet of thermoplastic material to be cut will now be described. The holder generally comprises upper and lower members 30 and 32, respectively, which are provided with central openings 34 and 36 in alignment with each other when the holders are in assembled relationship as shown. A number of openings 38, which may be equally spaced or otherwise are provided around the opening 36 in the lower member 32. A needle 40 is forced within each of the openings 38 and extends upwardly from the lower member 32. The needles are preferably formed with uniform conical points, as shown, to prevent tearing of the sheet of thermoplastic material when assembled therewith as will be described. When the members 30 and 32 are assembled, the conical points of the needles are received within openings 42 in the upper member 30, with the number of openings 42 being equal to the number of openings 38, although the openings 42 are larger. Thus, it may be seen that the upper and lower members may be assembled by positioning the needles 40 of the lower member 32 within the openings 42 of the upper member and then moving the members together to align the openings 34 and 36.

In order to accurately assemble the members, three studs 44 are fixedly secured within openings 46 in the lower member 32 and are received within openings 48 in the upper member which are of substantially the size of the studs. It will be noted that the studs are unequally positioned so that it is impossible to assemble the upper and lower members in the wrong manner. In order to provide a means for separating the members, portions 50 of opposing side edges of the upper and lower members are severed to provide finger grips.

When the upper and lower members are disassembled, a sheet 52 of thermoplastic material is forced over the conical points of the needles 40 in the lower member so that the sheet of thermoplastic material is tautly held across the opening 36 of the lower member. Thereafter, the upper member 30 is assembled with the lower member so that the sheet of thermoplastic material is tautly held across the aligned openings 34 and 36 of the members. Since the sheet of thermoplastic material is under tension during the severing operation, it is preferred that the needles 40 have uniform conical points to prevent tearing of the sheet when under tension.

It is preferred that the sheet of thermoplastic material be unsupported, i.e., have no fabric or other backing. Excellent results have been obtained with sheets of vinyl chloride and vinylidene chloride of sixteen gauge, although other gauges of the material or of other materials may be used. However, it is preferred that all be in sheet form. The sheet may be of any known thermoplastic material, such as vinyl chloride, vinylidene chloride, etc., and may be tooled or otherwise provided with a decorative surface. The sheets may also be of any color desired.

It will be noted that the lower member 32 of frame 28 is provided with a continuous facing 54 of resilient material secured to its free surface. This resilient material may either be foam rubber, polyurethane foam, or sponge silicone rubber, with the latter two materials being preferred over the former material. The purpose of the facing 54 will be hereinafter discussed. After the sheet of thermoplastic material 52 has been assembled within the frame or holder, the holder is then positioned on the sheet 22 of trim material, with the facing 54 of resilient material on the lower member of the holder in engagement therewith. Thus, the sheet 52 of thermoplastic material is positioned in a horizontal plane generally parallel to the plane of the lower press electrode and sheet 22.

A die 56 is secured in a suitable manner to the upper or movable press electrode 12. Referring now to Figures 5 and 6, one or more openings 58 may be provided in the die to receive bolts which may be threaded into the electrode to rigidly secure the die in place. The die generally comprises a block of thermally conductive metal, such as steel, bronze, brass or copper, or other material. The outer periphery of the die generally comprises a continuous vertical wall 60 which defines the size or shape of the finite portion to be severed from the sheet 52 of thermoplastic material.

A continuous rib 62 provided at the juncture of wall 60 with the flat or horizontal base wall 64 of the die controls the severing of the finite portion from the sheet 52 of material and also acts to provide an embossing line around the periphery of the finite portion when the finite portion is embossed on the trim assembly 17. It is preferable that the rib 62 be integral with the material of the die although it may be formed separate and secured thereto in a suitable manner if so desired. It is also preferable that the outer wall 65 of the rib 62 be coplanar with or a continuation of the vertical wall 60 of the die and that the inner wall 66 thereof be generally parallel to the outer wall. The radius of the outer edge 67 of rib 62 controls the electrical field around the outer edge of the die to cause selective heating of the sheet 52 of thermoplastic material in a relatively narrow area immediately adjacent the outer edge of the die as will be described. Although the radius is not critical, it is preferable that it be from .005 to .010 inch.

If additional embossing lines are desired within the periphery of the finite portion, one or more embossing ribs 70, equally spaced or otherwise, may be provided within the continuous rib 62 as shown in Figure 5. As indicated in Figure 1 of the drawings, the ribs 70 extend outwardly from the base wall 64 of the die a greater distance than does the rib 62. Although the disparity in extent is somewhat exaggerated in Figure 1, it is preferred that the embossing ribs extend outwardly further from wall 64 of the die from .010 to .060 inch more than does the rib 62. In addition, it is also preferred that the edges 72 of ribs 70 be formed on a .03125 inch radius, as compared to a radius of .005 to .010 inch for the edge 67 of rib 62. The reason for this arrangement of the extent and radius of the ribs 70 and 62 will be hereinafter described.

Figure 2:
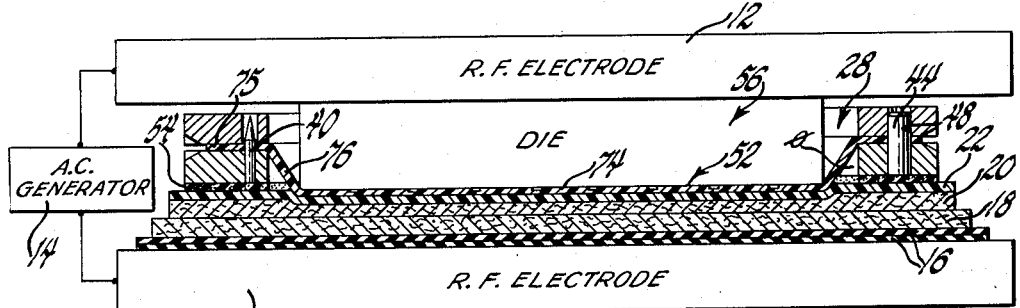
Figure 2 is a view similar to Figure 1 and showing the press and sheet of thermoplastic material during the severing operation.

When the trim assembly and the holder 28 with its sheet 52 of thermoplastic material have been positioned within the press, as shown in Figure 1, the upper or movable press electrode 12 is moved downwardly until the die 56 engages the sheet 52 of thermoplastic material within the openings 34 and 36 of the holder and depresses a finite portion 74 thereof out of the horizontal plane of the material and into engagement with the sheet 22 of thermoplastic material, as shown particularly in Figure 2. This finite portion 74 lies in a horizontal plane and is generally of the shape of the outer periphery of the die 56 as defined by the wall 60 thereof and the outer wall 65 of rib 62. The portion 74 is joined to the remainder portion 75 of the sheet 52 in a horizontal plane by a continuous intermediate portion 76 which is angular to the horizontal plane of the finite portion 74 and to the horizontal plane of the remainder portion 75 of the thermoplastic sheet 52. It will also be noted that when the die 56 engages the sheet 52 to depress the finite portion 74, the force of the die causes the resilient facing 54 on the lower member 32 of the holder to become partially compressed.

The distance through which the holder 28 moves downwardly upon compression of the resilient facing 54 is less than the distance between the planes of the remainder portion 75 and the finite portion 74 so that the finite portion 74, the intermediate portion 76, and the remainder portion 75, from its attachment to the needles 40 to its juncture with the intermediate portion 76, are placed in tension. In the arrangement shown, the lower member 32 of the holder is .25 inch thick and the resilient facing 54 of the lower member is also .25 inch thick when free. When the die 56 engages the sheet 52 of thermoplastic material with a pressure, preferably from 100 to 500 lbs. per square inch, the facing 54 will be compressed approximately 50%.

The above dimensions together with the distance between the wall 60 of die 56 and the walls of the openings 34 and 36 of holder 28 further control the angle θ, theta, which the intermediate portion 76 makes with the horizontal plane of portion 74. This angle preferably should fall between 30 and 55 degrees as will be hereinafter described. If the distance between the wall 60 of the die and the walls of openings 34 and 36 is .375 inch and the other dimensions remain as outlined above, the angle theta will be approximately 45 degrees.

When the die 56 has been moved into engagement with the sheet 52 of thermoplastic material, as shown in Figure 2 of the drawings, an alternating current of radio frequency is impressed across the upper and lower electrodes 12 and 10, respectively. The voltage may be between 1,200 and 4,000 volts, and the frequency between 1 and 100 megacycles. It is intended that the A.C. generator 14, which is in series with the electrodes, be capable of generating a field within this voltage range and frequency range.

Since an electric field tends to concentrate at sharp corners or edges, the field will tend to concentrate around the periphery of the die 56, particularly at the edge 67 of the rib 62 thereof, in order to pass from this edge to the lower electrode 10 as outlined schematically in Figure 2 of the drawings. It will be remembered that the radius of the edge 67 of rib 62 is smaller than the radius of the edges 72 of the embossing ribs 70. This difference in radius is desirable in order to reduce the intensity of the electric field between the edges 72 of the ribs 70 and the lower electrode 10 so as to prevent any severing of the finite portion within its boundary.

As the electric field passes between the edge 67 of rib 62 and the lower electrode 10, the greatest concentration of the field will be immediately adjacent the edge 67 so that a relatively narrow area of the intermediate portion 76 immediately adjacent the edge 67 will be heated to the highest temperature. This relatively narrow area will be spaced approximately 10 to 15 thousandths of an inch from the edge 67 of the rib 62 and the temperature range in the area will be from 150° F. to 300° F. It is intended that the softening temperature of the sheet 52 of thermoplastic material be within this range so that the relatively narrow area of the intermediate portion 76 will be softened more than any other area but will not be burned or charred. As the relatively narrow area in the intermediate portion 76 becomes softened, the tension between the finite portion 74 of the sheet and the intermediate portion 76 will cause the finite portion 74 to be separated from the remainder of the sheet. This separation is clean along a continuous line without any ragged edges being left on either the finite portion or on the intermediate portion 76. When the finite portion 74 becomes separated, the resilient facing 54 on the lower member 32 of holder 28 causes the holder to move slightly upwardly to remove the intermediate portion 76 away from the finite portion and the sheet 22 of thermoplastic material of the trim assembly 17.

Thereafter, as the die 56 continues to hold the finite portion against the sheet 22 of the trim assembly, the electric field passing between the die and the lower electrode 10 will cause a softening of the finite portion and sheet 22 along embossing lines defined by the rib 62 and the ribs 70 to fuse the finite portion to the sheet 22 of thermoplastic material along these lines. However, intermediate the lines, there is no fusing between the finite portion and the sheet 22 of thermoplastic material.

It will be remembered that the layer 20 of padding between the sheet 22 of thermoplastic material and the backing 18 of the trim assembly is provided with thermoplastic material in either powdered or fiber form. The electric field passing between the die and the lower electrode 10 will also heat this thermoplastic material within the layer 20 so that the thermoplastic material softens and flows to fuse the sheet 22 to the backing 18 through the layer of padding 20. Again, this fusing will be along lines defined by the ribs 62 and 70 with no fusing taking place intermediate these lines.

As previously stated, the pressure of the die 56 on the finite portion is from 100 to 500 lbs. per square inch. This pressure continues through the severing operation and the subsequent embossing operation of the finite portion on the trim assembly. The electric field remains for a period of from 1 to 20 seconds, with a normal heating cycle being about 10 seconds. However, the electric field between the die and the lower electrode is turned off before the upper electrode 12 and the die 56 are moved out of engagement with the finite portion after the embossing operation. It is preferred that the die 56 remain in engagement with the finite portion for a period of from 2 to 10 seconds after the heating cycle in order to quench the finite portion and sheet 22 along the embossing lines. When the electrode 12 and the die 56 have moved out of engagement with the finite portion 74 after the embossing operation, the frame 28 is removed and the entire assembly is then removed from the press. The finished assembly will then include the backing 18, the intermediate layer 20, and the sheet 22 of thermoplastic material which will be provided with an insert defined by the finite portion 74, with each of these materials being secured together along embossing lines to define a pattern which is defined by the rib pattern of the die 56. If desired, the finite portion 74 and the outer layer 22 of thermoplastic material may be of different colors to provide a more pleasing appearance to the finished assembly.

It will be remembered that the ribs 70 extend further from the base wall 64 of the die than does the rib 62. By so locating the ribs with respect to each other, the ribs 70 will provide the major engagement between the die and the finite portion during the cutting operation while the rib 62 will only slightly engage the finite portion. As previously mentioned, the die 56 is not heated in any manner except by conduction. By having the ribs 70 extend further than rib 62, the ribs 70 will quench the thermoplastic material at their areas of engagement therewith to a much greater degree than rib 62 at its area of engagement with the material, so that this quenching together with the difference in radius between the edges 72 of the ribs 70 and the edge 67 of the rib 62 will prevent any severing of the finite portion within its peripheral edge during the severing operation of the finite portion from the sheet 52.

It will be noted, however, that the ribs 70 do not necessarily have to extend further outwardly from the base wall 64 of the die than does rib 62 in all instances. The discrepancy in extent of the ribs is controlled primarily by the thickness of the sheet 22 of trim material. If the thickness is large, in the range of 1/64 to 1/16 inch, then it is preferable that ribs 70 be of a greater extent than rib 62. However, as the thickness decreases the discrepancy in extent becomes less critical and the ribs 62 and 70 may either be of the same extent or ribs 70 may be of greater extent. Thus, the discrepancy in extent varies with particular trim materials.

It will also be noted that the difference in radii of the edges of ribs 62 and 70 may not be necessary in instances. Again, this will depend on the particular trim assembly and in certain instances the radii of the edges of the ribs 70 may be the same as the radius of the edge 67 of rib 62.

It will also be remembered that the angle theta between the intermediate portion 76 and the horizontal plane of the finite portion 74 should fall between 30 and 55 degrees, and will be 45 degrees in the particular arrangement shown in the drawings. If this angle were zero degrees, then the efficiency of the electric field would be maximum since there would be no engagement between the rib 62 and the sheet 52 of thermoplastic material, the only engagement being between the ribs 70 and the sheet of thermoplastic material. Thus, without any engagement between the rib 62 and the sheet 52 of thermoplastic material, the rib 62 could not in any manner quench the thermoplastic material to draw heat away from the material at the relatively narrow area of highest temperature immediately adjacent the rib. Likewise, if the angle theta were 90 degrees, the efficiency of the electric field would be minimum since the area of greatest heating would then be in engagement with the die so as to be quenched while it is heated. Thus, the preferred range between 30 and 55 degrees is a compromise between maximum and minimum efficiency. Within this range, the sheet 52 of thermoplastic material will be in engagement with the outer edge 67 of rib 62, although the relatively narrow area of greatest heating of the sheet will be out of engagement with the rib. However, since the distance between the edge 67 and the area of greatest heating is relatively small, there will be some quenching of this narrow area by rib 62 and the die 56. However, this quenching does not reduce the efficiency of the electric field to a point where it will prevent the field from severing the finite portion from the sheet 52 of thermoplastic material.

When the method for severing the finite portion from a sheet of thermoplastic material is used in conjunction with a subsequent embossing operation to provide a continuous operation, it is preferable that the finite portion 74 be held in engagement with the sheet 22 of the trim assembly during the severing operation so that the finite portion, when cut, is accurately positioned in place with respect to the trim assembly. This engagement of the finite portion and sheet 22 also decreases the time required for the severing operation since the sheet 22 is being heated in the same area. Thus, heat will be transferred by conduction from the sheet 22 to the sheet 52 to the area of highest temperature to decrease the time required for severing. It will also necessarily follow that the time required for the embossing operation will be decreased since the periphery of the finite portion 74 and the sheet 22 in the area of rib 62 will already be softened.

If the method is used only for severing finite portions from sheets of thermoplastic material, it is not necessary that the finite portion 74 be held in engagement with any other material during the severing operation. Thus, when the die 56 is moved into engagement with the sheet 52 of thermoplastic material to depress the finite portion 74 thereof, the portion 74 may be spaced from the buffer sheets 16 during the severing operation, or, if desired, the press electrodes and the buffer sheets 16 may be arranged so that the finite portion 74 will be held in engagement with the buffer sheets 16 during the severing operation. Either manner of severing the finite portion 74 from the sheet 52 of thermoplastic material may be used with equal success if there is no subsequent embossing operation. Of course, if the method of this invention is used only for severing finite portions from sheets of thermoplastic material, there is no need for providing any of the ribs 70 or otherwise, since only the rib 62 is needed.

It will also be noted that the method of this invention can be used with equal success to merely sever a piece of thermoplastic material into two pieces, whether in sheet form or otherwise. Thus, if a sheet of thermoplastic material is to be severed into two pieces, opposite portions of the sheet to either side of the sever line may be fixed within a suitable holder with the edge portions of the sheet transverse to the sever line being free. Thereafter, a die having a rib can engage the sheet at the sever line, with the rib extending beyond the free edge portions of the sheet. Since the sever line and engagement of the rib with the sheet will be transverse to the tension in the sheet, the sheet will be severed as hereinbefore set forth. Thus, this invention broadly encompasses the severing of thermoplastic trim materials by means of dielectric heating.

Thus, this invention provides an improved method for severing thermoplastic material by means of dielectric heating. The finite portions which may be severed in accordance with the method of the invention may be of any size or shape and will have a sharp and well defined peripheral edge which is not ragged in any manner. The subject method is entirely different from mechanical cutting processes since it does not depend on a sharp blade or other member engaging and entering the thermoplastic material to thereby provide the required separation. Although the die 56 has been shown of a particular shape with regard to the shape of the rib 62, other dies of other shapes may be used with equal success. These dies may be symmetrical or asymmetrical as desired, but it is preferable that the shape of the openings 34 and 36 in the holder 28 be of the shape of the die although larger. In addition, it is not necessary that any ribs 70 or otherwise be provided within the continuous rib 62 or otherwise of the die, since the rib 62 will act in and of itself to not only sever a finite portion from the sheet of thermoplastic material but also to emboss this portion on the trim assembly 17 and to secure various layers of the trim assembly to each other and to the finite portion along an embossing line. In addition, although a particular trim assembly 17 has been shown and described, reference may be had to applicants' hereinbefore mentioned copending application for a further description of other trim assemblies which may be used with equal success.

We claim:

1. A method of severing a finite portion from a sheet of thermoplastic material comprising the steps of positioning a sheet of thermoplastic material between two electrodes but out of contact with both, moving one of said electrodes of the size of the finite portion into engagement with the sheet, further moving said one of said electrodes whereby the portion of said sheet in contact with said one of said electrodes is displaced out of its original position while the remainder of said sheet is held in its original position thus setting up a tension in said sheet, and applying high frequency energy to said electrodes to generate heat at the perimeter of the displaced portion of said sheet, the heat causing the material to be softened and to separate at its points of maximum tension which points comprise the outer edge of the displaced portion of said sheet.

2. The method of severing a finite portion from a sheet of thermoplastic material as defined by claim 1 wherein said high frequency energy comprises an alternating current having a frequency of from 1 to 100 megacycles across the electrodes to cause the continuous electric field around said one of said electrodes to generate heat in the thermoplastic material in a continuous narrow area defined by the perimeter of the displaced portion.

3. A method of severing a finite portion from a sheet of thermoplastic material comprising the steps of supporting a generally planar sheet of thermoplastic material adjacent and spaced from a first electrode moving a complementary electrode of substantially the size of the finite portion to be severed into engagement with the sheet, further moving said complementary electrode whereby the portion of said sheet in contact with said complementary electrode is displaced out of its original position while the remainder of said sheet is held in its original position thus setting up tension in said sheet, and applying high frequency energy to the electrodes to generate heat at the perimeter of the displaced portion of said sheet, the heat causing the material to be softened and to separate at its point of maximum tension corresponding to the outer edge of the displaced portion of said sheet.

4. A method of severing a finite portion from a sheet of thermoplastic material comprising the steps of tautly holding a generally planar sheet of thermoplastic material in a holder having an opening therein larger than the size of the portion to be cut from the sheet, positioning the holder on a first electrode to thereby tautly position the portion of the thermoplastic material within the opening of the holder in generally planar relationship by use of contact with said electrode moving a second electrode of substantially the size of the finite portion into engagement with the portion of the thermoplastic material within the opening of the holder, further moving said second electrode whereby the portion of said sheet in contact with said second electrode is displaced out of its original position while the remainder of said sheet is held in its original position thus setting up a tension in said sheet, and applying an alternating current of radio frequency across the electrodes to cause the continuous field around the periphery of said second electrode to generate heat at the perimeter of the displaced portion of said sheet, the heat causing the material to be softened and to separate along its lines of maximum tension which lines comprise the outer edge of the displaced portion of said sheet.

References Cited in the file of this patent
UNITED STATES PATENTS

| | | |
|---|---|---|
| Re 23,171 | Borkland | Nov. 29, 1949 |
| 2,120,328 | Ferngren | June 14, 1938 |
| 2,293,721 | Engler | Aug. 25, 1942 |
| 2,388,838 | Egli | Nov. 13, 1945 |
| 2,425,123 | Quayle et al. | Aug. 5, 1947 |
| 2,510,383 | Dalgleish | June 6, 1950 |
| 2,631,646 | Gannon et al. | Mar. 17, 1953 |
| 2,638,963 | Frederick et al. | May 19, 1953 |
| 2,758,631 | Peterson et al. | Aug. 14, 1956 |